No. 629,607. Patented July 25, 1899.
J. C. ROBERTS.
BATTER MACHINE.
(Application filed Oct. 5, 1898.)
(No Model.) 3 Sheets—Sheet 1.
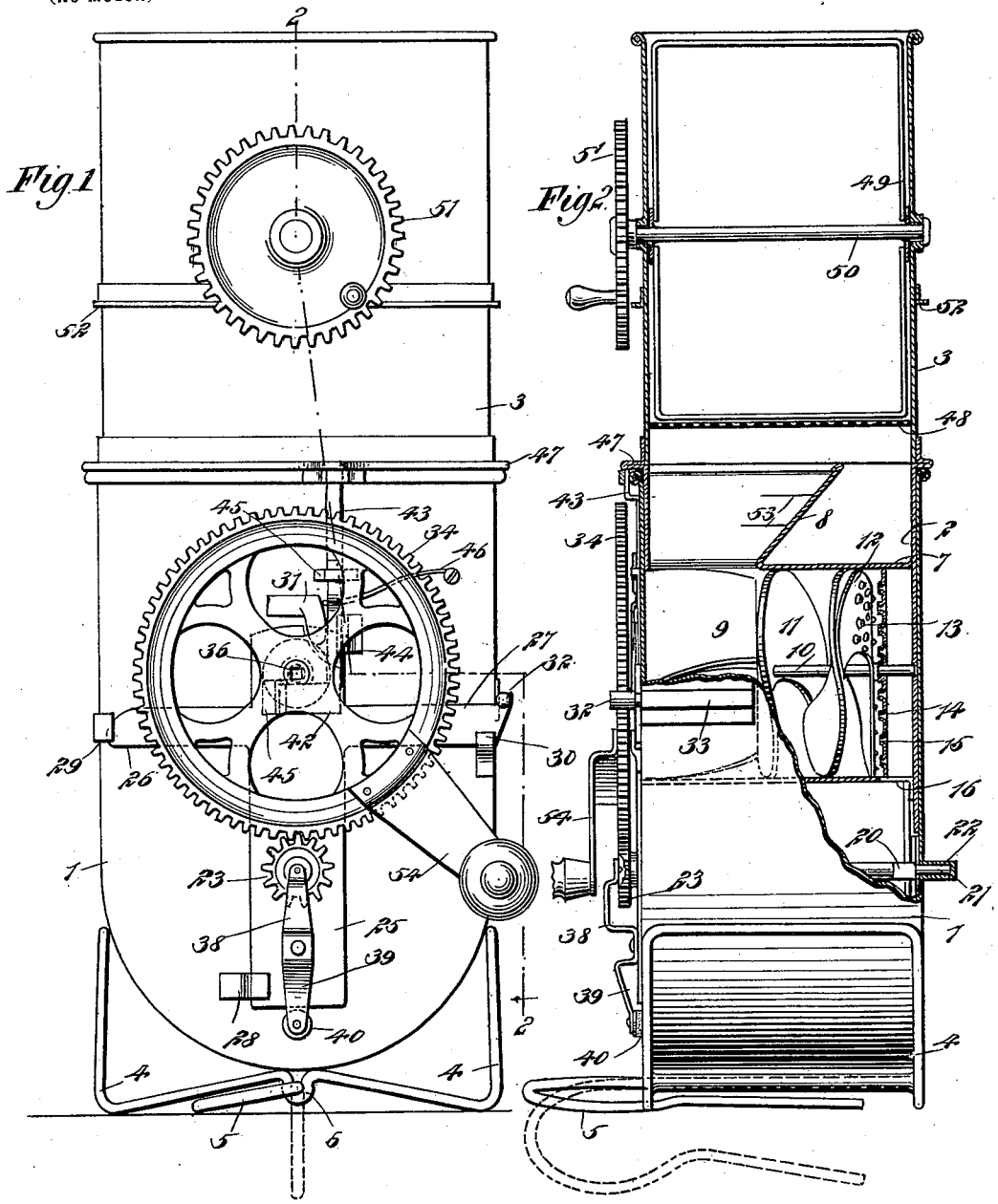
*Fig. 1*
*Fig. 2*
*Fig. 3*
WITNESSES:
INVENTOR
John C. Roberts.
BY
ATTORNEYS.

No. 629,607. Patented July 25, 1899.
J. C. ROBERTS.
BATTER MACHINE.
(Application filed Oct. 5, 1898.)
(No Model.) 3 Sheets—Sheet 2.
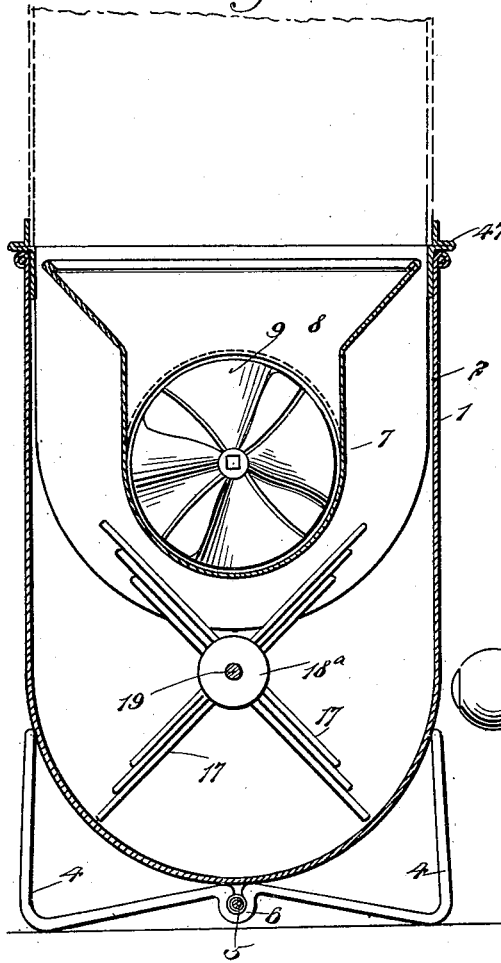
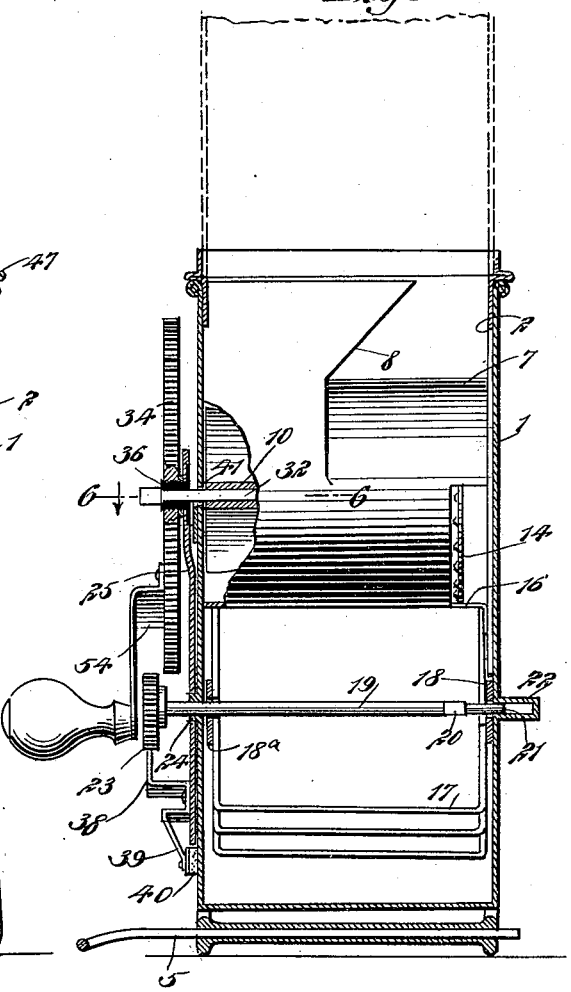
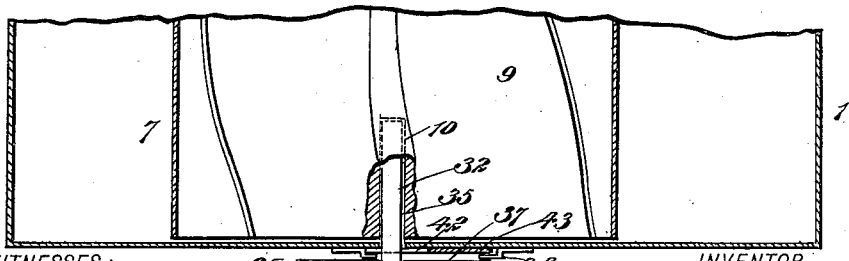
WITNESSES:
INVENTOR
John C. Roberts.
BY
ATTORNEYS.

No. 629,607. Patented July 25, 1899.
J. C. ROBERTS.
BATTER MACHINE.
(Application filed Oct. 5, 1898.)
(No Model.) 3 Sheets—Sheet 3.

WITNESSES:

INVENTOR
John C. Roberts.
BY
ATTORNEYS.

UNITED STATES PATENT OFFICE.

JOHN CALVIN ROBERTS, OF BEDFORD, PENNSYLVANIA.

BATTER-MACHINE.

SPECIFICATION forming part of Letters Patent No. 629,607, dated July 25, 1899.

Application filed October 5, 1898. Serial No. 692,687. (No model.)

*To all whom it may concern:*

Be it known that I, JOHN CALVIN ROBERTS, of Bedford, in the county of Bedford and State of Pennsylvania, have invented a new and Improved Batter-Machine, of which the following is a full, clear, and exact description.

This invention relates to improvements in machines for making or forming batter for cakes or the like; and the object is to provide a machine of this character in which the ingredients for forming the batter may be quickly and thoroughly reduced to the proper consistency and then stirred together and made ready for the oven.

I will describe a batter-machine embodying my invention and then point out the novel features in the appended claims.

Reference is to be had to the accompanying drawings, forming a part of this specification, in which similar characters of reference indicate corresponding parts in all the views.

Figure 7:
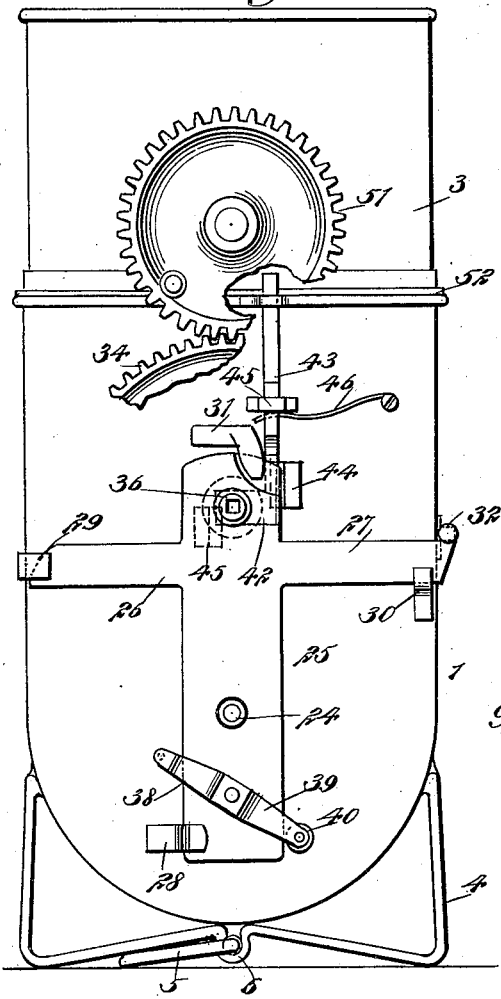
Figure 8:
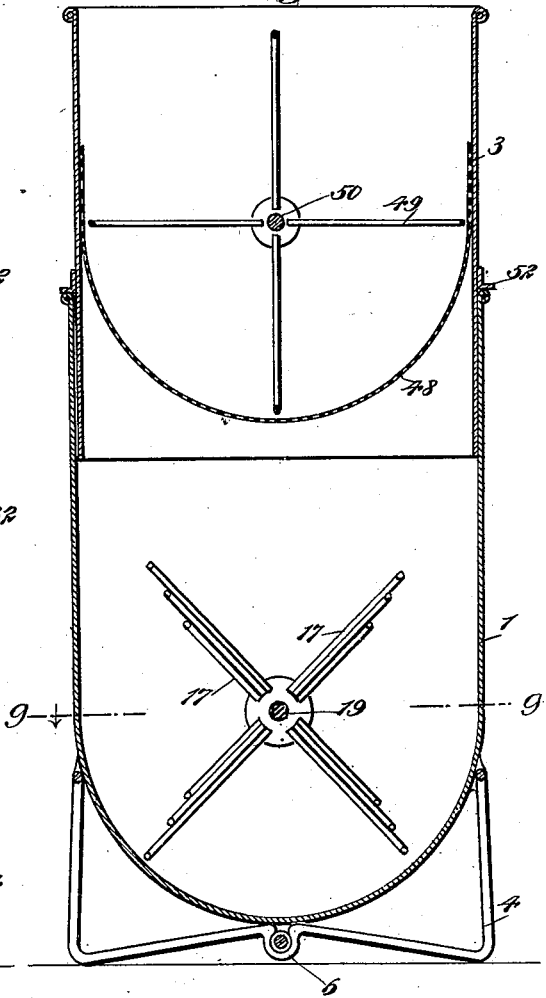
Figure 9:
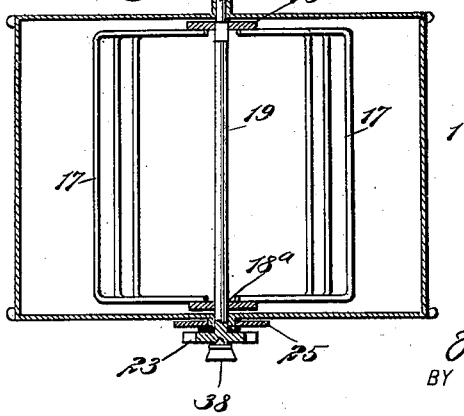

Figure 1 is a side elevation of a batter-machine embodying my invention. Fig. 2 is a section on the line 2 2 of Fig. 1. Fig. 3 is a perspective view of a locking-pin employed. Fig. 4 is a vertical section with the flour-sifter removed. Fig. 5 is a section at right angles to Fig. 4. Fig. 6 is a section on the line 6 6 of Fig. 5. Fig. 7 is a side elevation showing the parts in position for operating the flour-sifter. Fig. 8 is a vertical section thereof, and Fig. 9 is a section substantially on the line 9 9 of Fig. 8.

The machine comprises a main body portion 1, a crusher-casing 2, and a sifter-casing 3. The bottom of the body portion 1 is rounded, as plainly indicated in the drawings, and is supported by legs 4. As a means for fastening the device to a table I employ a hook-shaped clamping-wire 5, which has its body mounted to rotate in bearings 6, formed by the wires of the legs 4. The hook portion of this clamp is designed to engage underneath the top of a table, shelf, or the like.

The sugar-crusher casing is provided with a barrel portion 7 and a hopper 8. In the barrel portion is mounted to rotate a conveyer and crusher comprising fan-blades 9, having a spiral trend on the shaft 10, and at the end of these blades is a spiral conveyer 11, which at its ends communicates with the spiral crusher 12, which has projections 13, designed to grind the sugar, to be pressed against a disk 14, having projections 15 on the side adjacent to the crusher portion 12, and this disk is provided with openings, which are formed between the projections. In the bottom of the barrel is an outlet 16 for sugar, this outlet being substantially in line with the crushing devices, and is designed to allow the passage of sugar to the body portion 1 of the device, as will be hereinafter described.

Mounted in the body portion 1 is a beater consisting of yokes or arms 17, extended radially from hubs 18 18$^a$, through which a shaft 19 loosely passes. The inner end of the shaft 19 has an angular portion 20 to engage in a correspondingly-shaped opening in the hub 18, and the said shaft has a reduced cylindrical portion 21, designed to engage in a cup-bearing 22, formed on the body portion and having its outer end closed. This shaft 19 is movable longitudinally for purposes to be hereinafter described, and its outer end is provided with a pinion 23. The end of the shaft 19 adjacent to the pinion 23 has a bearing in a lug 24, formed on the body portion of the casing, and removably mounted on this lug is a gearing-frame consisting of a vertical member 25 and laterally-extended members 26 27.

When in position on the machine, the gearing-frame has its lower end engaged by a clip 28 on the body portion, the arm or lateral extension 26 engages with a clip 29 on the body portion, the lateral extension 27 engages with a clip 30 on the body portion, and the upper end of the vertical member engages with a clip 31 on the body portion. The gearing-frame is held from rotation by means of a pin 32, which engages with the upper side of the lateral extension 27 and passes into a keeper 33. The pin 32 is not only intended at a certain time to lock the gearing-frame in position, but it is also intended to make an operative connection between a driving-wheel 34 and the shaft 10 of the crusher. Therefore this pin is made angular in cross-section, and a similarly-shaped hole is made longitudinally in the shaft, as indicated at 35.

The driving-gear 34 is mounted on a hub 36, and, as here shown, the hub has an exterior screw-thread to engage with a thread in the gear, so that by turning said gear in one direction it may be removed from the hub; but by turning it in the opposite direction it will rotate the hub. This hub is provided with a longitudinal central opening corresponding to the shape of the pin 32, which is designed to pass through said opening and into the opening of the shaft 10. The hub is mounted to rotate in the upper portion of the gearing-frame. On its inner end the hub has an annular flange 37, which is countersunk into the inner side of the gearing-frame, as plainly indicated in Fig. 6. Therefore this flange will have its inner face flush with the inner face of the gearing-frame.

When the shaft 19 is moved inward to its operative position, with its pinion 23 engaging with the gear 34, the said shaft is held in place by means of a spring-latch 38, which is pivoted on the lower end of the vertical member 25 of the gearing-frame. This latch 38 is designed to engage with its ends yieldingly against the center of the pinion 23. The latch has an opposite extension 39, provided with a valve 40, designed to close the opening through the lug 24 when the shaft 19 is removed, as will be hereinafter described.

A closure is also provided for the opening 41 in the casing when the crushing device is removed. This closure comprises a plate 42, extended laterally from the stem 43, mounted to move vertically in suitable guides 44 45. The closure 42 is moved automatically to its closing position by means of a spring 46, fastened at one end to the body portion of the machine and engaging at the other end with a pin or other device on the stem 43. The upper end of the casing 2 has a flange 47, designed to bear upon the upper end of the casing or body portion 1 when the crushing device is in position, and this flange 47 is also designed to engage with the upper end of the stem 43 to force the closure 42 downward when said casing 2 is inserted, so that the pin 33 may be inserted.

In the casing 3 is a sieve-bottom 48, and an agitator, comprising wire arms or yokes 49, is mounted on a shaft 50, arranged to rotate in the casing 3 and having on its outer end a gear-wheel 51, designed to be placed in engagement with the gear 34, as will be described in the operation. When the sifter is in use, the crushing device is to be removed from the casing or body portion 1 and the sifter put in its place, and to prevent the sifter from moving too far downward into the casing 1 I provide it with flanges 52, designed to engage upon the top of the casing 1.

Figs. 1 and 2 show the arrangement of the several parts when the device is not in actual use. This arrangement makes the device convenient for packing or storage.

In operation the flour-sifting device is to be removed with the crusher left in the casing 1. During the operation of crushing or grinding the sugar the beaters 17 are to remain stationary. Therefore the latch 38 is to be moved out of engagement with the pinion 23, so that the shaft 19 may be drawn outward to disengage the pinion from the gear 34, as plainly indicated in Fig. 5. The proper amount of sugar is now to be placed in the hopper 8, and the amount or number of pounds may be gaged by graduating-marks 53, formed on the interior of the hopper. As before stated, by placing the casing 2 in position the plate 42 will be moved downward, so that the pin 32 may be passed through the hub 36 and into the shaft 10. Now by rotating the gear 34 by means of its crank 54 the crusher will be rotated, the blades 9 will move the sugar into engagement with the conveyer-blade 11, and this will convey the sugar to a point between the crushers 12 and 14, where it will be thoroughly pulverized, and this pulverized sugar will fall through the opening 16 into the body portion of the casing 1. After placing the pulverized sugar in the body portion or casing 1 the pin 32 is to be removed and placed in the keeper 33, and then the crusher is to be lifted out. After this the shaft 19 is to be moved inward, so that the pinion 23 meshes with the gear 34 and is locked in place. Then by rotating said gear 34 the beaters 17 will be operated to thoroughly mix the sugar with the eggs that have been previously placed in the body portion or casing 1. The sifter is now to be placed in position. When in position, its gear-wheel 51 will mesh with the main gear 34, so that by rotating the main gear 34 the arms 49 in the sifter will be rotated, as will also the beaters in the body portion; but the beaters in the body portion will be rotated much faster than the arms in the sifter, because the pinion 23 is much smaller than the gear-wheel 51. This will cause a complete and rapid mixing of the several ingredients to form the batter. When the batter is completed, the sifter is to be removed. Then the shaft 19 is to be drawn completely out, so that the beaters 17 may be removed. Then the plug or valve 40 is to be turned to close the opening of the lug 24. After this the formed batter may be poured out into suitable molds or baking-pans ready for the oven.

The gearing-frame is made removable, so that it may be thoroughly cleaned or washed and also that the outer side of the casing may be washed.

The beaters 17 may be of any preferred and suitable form, and instead of a series of beaters a single beater may be employed.

Having thus described my invention, I claim as new and desire to secure by Letters Patent—

1. In a batter-machine, a body or main casing, a beater mounted to rotate in said body or main casing, a crusher-casing adapted to removably engage in the first-named casing and having a barrel portion and a hopper, a crusher arranged in the barrel and comprising spirally-disposed blades, a spiral conveyer or plate, a spiral crushing-blade, a crusher-disk coacting with the crusher-blade, and means for rotating the crusher, substantially as specified.

2. In a batter-machine, a main casing, a crusher-casing removably placed in the main casing, a rotary crusher in said crusher-casing, a driving-gear, means for placing said driving-gear in operative connection with the crusher-shaft, a beater in the main casing, a longitudinally-removable shaft for supporting said beater, and a pinion on said removable shaft, for engaging with the drive-gear, substantially as specified.

3. In a batter-machine, a casing, a beater in said casing, comprising arms or yokes extended radially from hubs, a shaft removably engaging with said hubs, the said shaft having an annular portion to engage in a similarly-shaped portion in one of the hubs, a bearing-tube for one end of said shaft, a pinion on the outer end of said shaft, a locking-latch for engaging with the pinion for holding the shaft in position, and a main driving-gear adapted for engagement with said pinion, substantially as specified.

4. In a batter-machine, a main casing, a beater in said main casing, a gear-frame removably mounted on the casing, a hub mounted to rotate in said frame, a crusher removably mounted in the casing, a pin angular in cross-section adapted to pass through the hub of the driving-gear and into a longitudinal opening in the shaft of the crusher, an automatically-operated closure for closing the opening through the casing for the connecting-pin when said connecting-pin is removed, and a pinion on the shaft of the beater for engaging with the driving-gear, substantially as specified.

5. In a batter-machine, a casing, a beater in said casing, a longitudinally-removable shaft on which said beater is mounted, a pinion on the outer end of said shaft, a spring-latch for engaging with said pinion to hold the shaft in operative position, a plug or valve mounted on the casing for closing the opening through the casing for the beater-shaft, and a driving-gear for engaging with the pinion on the beater-shaft, substantially as specified.

6. In a batter-machine, a casing, a beater removably placed in said casing, a rotary crusher removably placed in said casing above the beater, a driving-gear, means for connecting said driving-gear with the crusher, and means for connecting said driving-gear with the shaft of the beater, substantially as specified.

7. In a batter-machine, a main casing, a rotary beater removably mounted in said casing, a rotary crusher removably mounted in the casing, a gearing-frame removably mounted on the casing, the said gearing-frame comprising a vertical section and laterally-extended sections, clips on the casing for engaging the ends of the sections, a driving-gear mounted to rotate on the frame, a pin angular in cross-section serving to lock said frame in position and also serving to engage the driving-gear with the shaft of the crusher, and a pinion on the shaft of the beater designed for engagement with the driving-gear, substantially as specified.

8. The combination, with a casing and a beater or the like therein, of legs comprising wires secured to said casing and extended across the bottom thereof, and a clamp, having its head portion mounted to rotate in bearings formed in the cross members of the legs and having a hook portion to engage underneath a table-top or the like, substantially as specified.

JOHN CALVIN ROBERTS.

Witnesses:
JNO. C. WRIGHT,
WM. S. LYSINGER.